F. C. MAEGLY.
TARE WEIGHT INDICATOR FOR FREIGHT CARS.
APPLICATION FILED MAY 2, 1913.
1,221,465.
Patented Apr. 3, 1917.
3 SHEETS—SHEET 3.
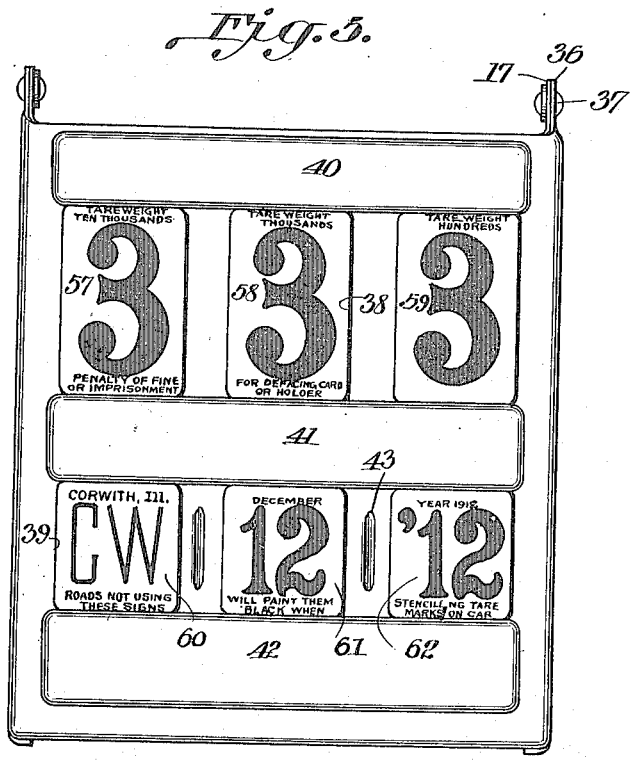
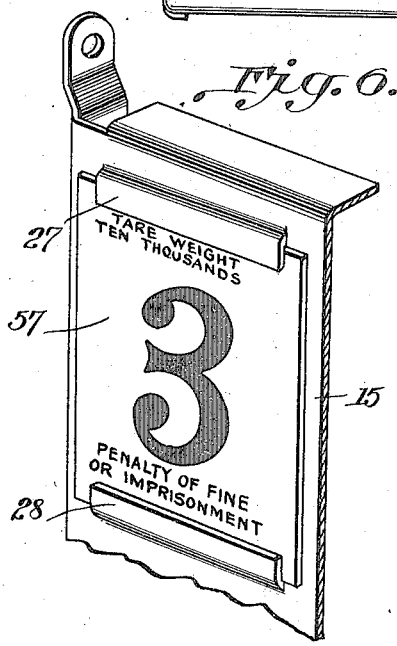
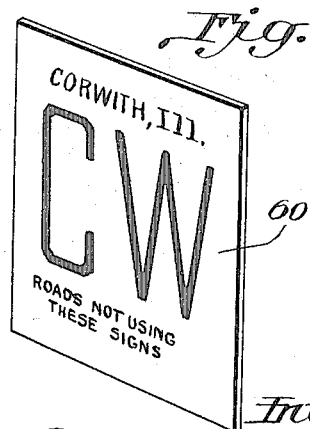
Inventor:
Frederick C. Maegly
Sheridan, Wilkinson & Scott
Attys.

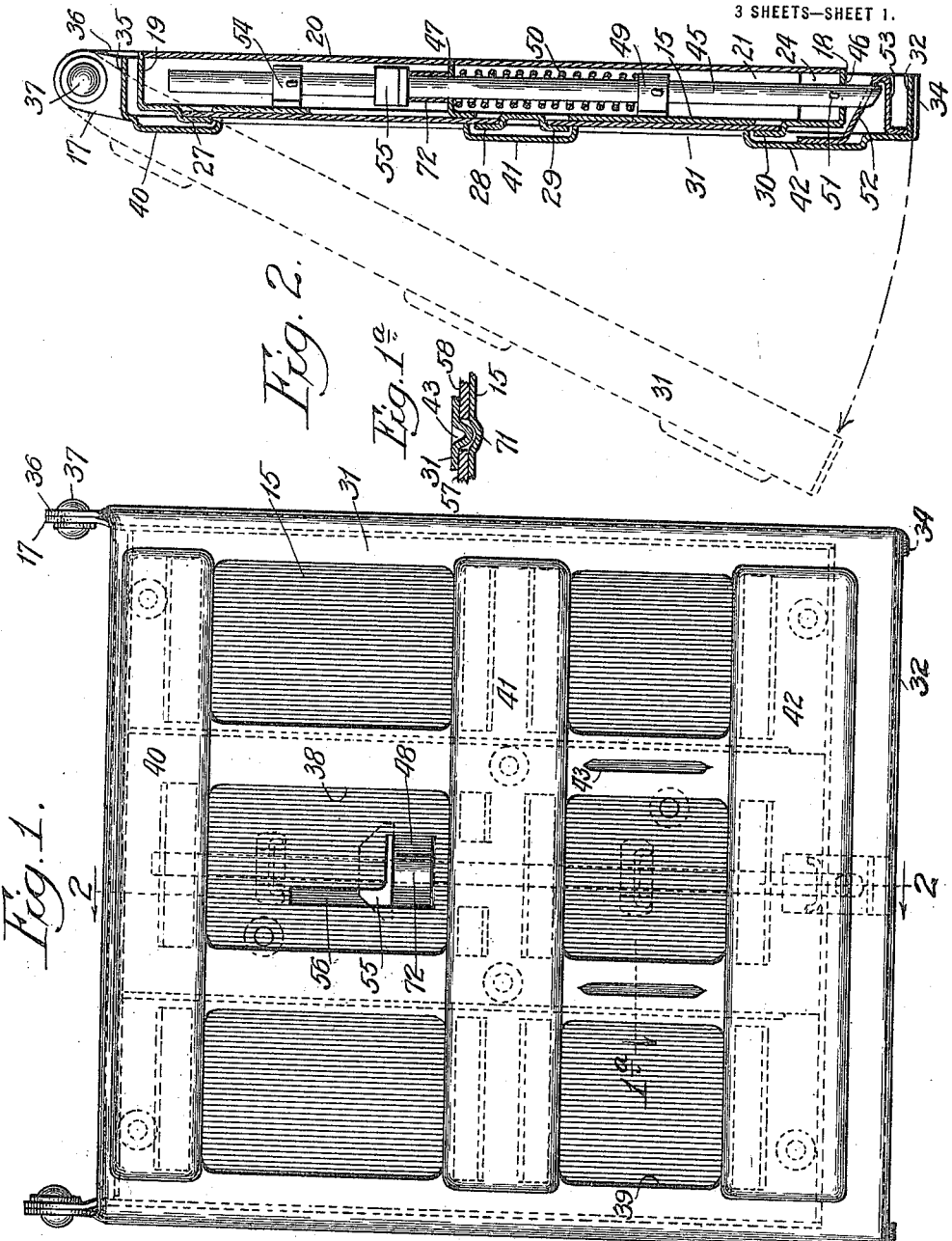

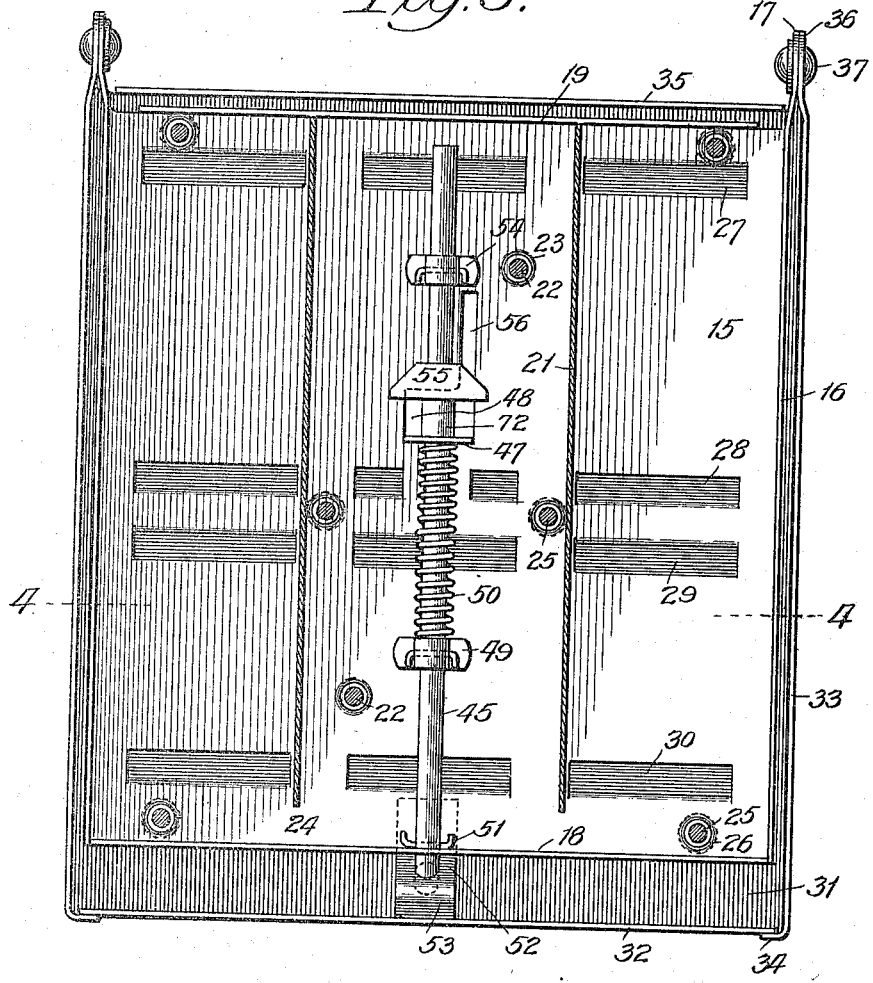
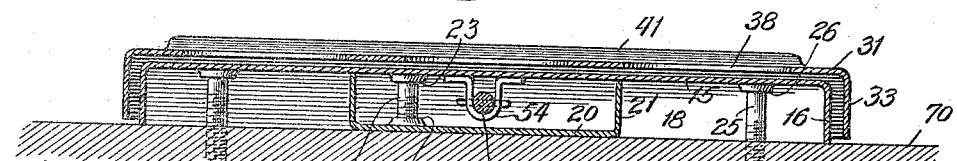

UNITED STATES PATENT OFFICE.

FREDERICK C. MAEGLY, OF CHICAGO, ILLINOIS.

TARE-WEIGHT INDICATOR FOR FREIGHT-CARS.

1,221,465. Specification of Letters Patent. Patented Apr. 3, 1917.

Continuation of application Serial No. 686,956, filed March 28, 1912. This application filed May 2, 1913. Serial No. 765,015.

*To all whom it may concern:*

Be it known that I, FREDERICK C. MAEGLY, a citizen of the United States, residing at Chicago, in the county of Cook and State of Illinois, have invented certain new and useful Improvements in Tare-Weight Indicators for Freight-Cars, of which the following is a specification.

One object of my invention is to provide an apparatus by which the light weights of freight cars can be exhibited on their outer side walls with security against alteration by unauthorized persons, and with facilities for making corrections by authorized persons when desirable. Another object is to provide such a device in which changes may be made by authorized persons in the shortest practicable space of time, reducing the cost of such service and insuring accuracy in the tare weights posted on the sides of freight cars.

This application is a continuation of my prior application, Serial No. 686,956, filed March 28, 1912, as to all subject matter which is common to the two applications.

More particularly my invention consists of a holder adapted to display cards or plates with numerals thereon indicating the light weights of the freight cars and certain data in connection therewith. One object of my invention is to provide such a holder with means for fastening it up so that the arrangement of the cards therein cannot be disturbed without making the alteration manifest. Still another object of my invention is to make such a holder that shall permit quick and easy arrangement of the cards or plates, so that a revision of the light weights can be effected readily by authorized persons, taking out the old tare weight information, and substituting the revised tare weight information whenever the cars are re-weighed and changes are necessary. Such alteration may be effected by means of my invention without detention to the station employees or the yard or train crews, as is now necessary with the existing appliances.

Due to a variety of causes such as repairs, the shrinkage of lumber and accumulation of waste, the light weight of a freight car is subject to almost constant change and it is therefore necessary that such light weight be determined at frequent intervals. The usual practice of weighing cars indiscriminately and painting the corrected weight on the car thereafter involves a great waste of time and labor and is open to many other objections.

A further object of the invention is to provide means for displaying cards or plates having numerals or symbols thereon, said displaying means being constructed in a novel manner so that the cards cannot be changed or altered in their arrangement without being torn or mutilated. A further object is to provide a holder for displaying cards adapted to indicate the light weight of the car, the name of the railroad, a symbol indicating the place where weighed, and the date when the weight is determined, these cards being arranged and used as hereinafter described, so that the indication of the device can be altered by authorized persons in a short space of time.

In the accompanying drawings I have illustrated one specific embodiment of my invention, together with alternative cards that may be employed in connection therewith. The device shown in the drawings serves as an example to illustrate and explain the principle of my invention, but it will be understood that the invention is defined in the appended claims.

Referring to the drawings—

Figure 1 is a front elevation of the device without any cards therein.

Fig. 1$^a$ is a fragmental section on the line 1$^a$ of Fig. 1.

Fig. 2 is a vertical section taken on the line 2—2 of Fig. 1, showing the information cards in place.

Fig. 3 is a rear elevation with certain parts in section to show the features of the device more clearly.

Fig. 4 is a horizontal section on the line 4—4 of Fig. 3.

Fig. 5 is a front elevation of the device with a set of cards therein.

Fig. 6 is a perspective view of a fragment of the holder showing an information card in position thereon.

Fig. 7 is a perspective view of one of the information cards shown in Fig. 5.

The principal element of the holder illustrated in these drawings is a sheet metal plate 15 with its side edges bent back at 16 and projecting up at the top to form ears or lugs 17 to which the cover may be pivotally attached by the rivets 37. The plate 15 has its lower edge turned back at 18 and its upper edge at 19. A channel 20 with side flanges 21 is provided to inclose and protect certain mechanism. This channel 20 is secured to the main plate 15 by the screws 22, which engage bosses 23 on the plate 15 and have their heads in the countersunk bosses 44. The side flanges 21 of the channel 20 are cut away at the lower end, as indicated by the reference numeral 24, so as to permit the escape of any trash from within the channel 20. The plate 15 is secured to the side wall 70 of the car by means of the screws 25, whose heads lie in the countersunk bosses 26. The lips 27, 28, 29 and 30 are struck out from the plate 15 as shown in the drawings so as to receive the display cards presently to be described.

The cover 31 has its lower edge 32 turned back and its side edges 33 also turned back with the lower ends 34 folded under at the corners and the upper ends extended to form hinge lugs 36. The upper edge of the cover 31 is doubled back as designated at 35. Three approximately rectangular openings 38 are made in the upper part of the cover 31 and three similar openings 39 across the lower part of the cover 31. The portions 40, 41 and 42 of the cover are struck out as shown in the drawings so as to accommodate the lips 27, 28, 29 and 30. Between the openings 39 the cover 31 has depressions 43 which register with depressions 71 in the body plate 15. (See Fig. 1ᵃ).

The latching bolt 45 passes through a hole 46 in the lower edge 18 of the plate 15 and also through a hole in the lug 47 that is struck back from the plate 15. The removal of the metal of the lug 47 from the plate 15 leaves the hole 48. A clip 49 is fixed on the bolt 45 and the compression coil spring 50 acts between the same and the lug 47. A cross pin 51 carried by the bolt 45 acts against the ledge 18 to limit the downward movement of the bolt 45. The cover plate 31 carries the member 53 with the inclined face 52 adapted to engage the beveled end of the bolt 45. Near its upper part the bolt 45 has fixed thereon a clip 54, between which and the lug 47 is the sliding block 55. A ferrule 72 spaces the block 55 from the lug 47. Adjacent to the bolt 45 and outside the sliding block 55 the plate 15 has a slot 56.

The weight indicating number cards are shown in Fig. 5, that for tens of thousands of pounds designated 57, thousands of pounds, 58, and hundreds of pounds, 59. Inasmuch as car weights are always determined and reckoned to the nearest hundred pounds, it will be seen that these cards are sufficient for the purpose. Each card not only displays in large type the digit of its appropriate order, but also in smaller type gives the designation of that order as "hundreds", "thousands", "ten thousands", so that if the cards should get displaced from their proper order this fact would readily be apparent on inspection and the necessary rearrangement could be made. The card 60 shown in Fig. 7 indicates in large type the abbreviation for the place where the weight was determined, and the full name of the place, Corwith, Ills., is given in smaller type. The cards 61 and 62 show respectively the month and year when the light weight determination was made. These three cards 60, 61 and 62 have a legend reading across when they are arranged in their proper order "Roads not using these signs will paint them black when stenciling tare marks on car."

The information cards just referred to may be of the form shown in Figs. 6 and 7, or if desired, the information conveyed by the upper row of cards or by the lower row of cards may be set out on single cards. It will be seen that each of the cards 57, 58, and 59, of the upper row are placed between the lugs or lips 27 and 28, and each card of the lower row is placed between the lugs 29 and 30, this arrangement being illustrated in Figs. 2 and 6, for instance. It will be seen that the cards of the upper row give the light weight of the car while the cards of the lower row show the place where the light weight was determined and also the date when such determination was made. After the light weight has been determined, the appropriate cards are selected and placed in position in the holder after which the movable element of the holder is swung downwardly until the latch operates automatically to hold it in closed position.

Assuming that the device is loaded and closed as shown in Fig. 5, it will be seen that the latching mechanism is entirely inclosed and it will be impossible to open it without mutilating the cards. Assuming that an authorized person desires to open the device, he thrusts a pointed instrument like a screw driver through the card 58 into the hole 48 at the lower end of the slot 56. Then he lifts the instrument along the slot 56, tearing the card 58 and raising the sliding block 55 until the latter strikes the clip 54 and thereby raises the bolt 45, disengaging its lower end from the member 52. This permits the cover plate 31 to be swung up and gives access to the cards.

The lip 35 at the top prevents rain water from getting down around the cards. Making the block 55 displaceable along the bolt 45 insures that a long cut or tear must be made in the card 58; it will be understood that if the block 55 were fixed on the bolt 45 a much less range of movement of the block would be sufficient to unlock the device. The arrangement of the member 53 within the ledge 32 makes it impossible to jump the bolt 45 up by an upward hammer blow on the lower side of the ledge 32. The registering bosses 43 and 71 between the openings 39 prevent the cards 60, 61 and 62 from being displaced laterally. The channel 20 on the back side of the device prevents any tampering with the mechanism in case it is applied to a stock car with more or less open woodwork. This channel also supports the body plate 15 and prevents it from bulging in or out.

I claim:—

1. In a device of the class described, an inner member to be attached to the side of the freight car, an outer member to overlie the inner member, cards clamped between the two members, said outer member having openings therethrough to display said cards, a concealed snap catch behind the inner member to lock the said two members together, and an inclosing casing behind said inner member, said inner member and said casing embracing said catch between them.

2. In a device of the class described, an inner member to be attached to the side of the freight car, an outer member to overlie the inner member, cards clamped between the two members, said outer member having openings therethrough to display said cards, a bolt behind the inner member adapted to latch the two members together, said inner member having a slot therein behind one of said cards, and a sliding block on said bolt adjacent to said slot.

3. In a device of the class described, a card holder comprising a fixed part and a relatively movable part, one of said parts comprising means to support a card and the other part having an aperture therethrough to display said card, and means for locking said movable part in operative position with respect to the fixed part, said locking means being operable only through said aperture.

4. In a device of the class described, an inner member to be attached to the side of a freight car, an outer member to overlie the said inner member, cards clamped between the two members, said inner member having a recess and said outer member having an inward projection to register therewith, said cards lying on either side of said recess and projection and being spaced apart thereby, and said outer member having openings therethrough to display said cards.

5. In a device of the class described, a card holder adapted to be attached to a car, an information card carried by the holder, said holder comprising a fixed part and a relatively movable part, one of said parts having an opening therethrough to display said card, and means for locking said movable part in operative position, said locking means being located behind said card whereby it can be operated to release said movable part only after breaking said card.

6. In a device of the class described, a card holder adapted to be attached to a car, said card holder comprising a fixed part and a relatively movable part, a card supported by said card holder, one of said parts having an opening therethrough to display the card, and locking means for locking said movable part in operative position with respect to said fixed part, said card holder comprising means for inclosing the locking means whereby it is accessible only through said opening, said locking means being located behind the card whereby it can be operated to release said movable part only after breaking the card.

7. In a device of the class described, a sheet metal inner plate adapted to be attached to the side wall of a freight car spaced a little therefrom, an outer sheet metal plate hinged thereto, a snap catch behind the said inner plate adapted to engage the outer plate when it is closed upon the inner plate, and cards clamped between the two plates, said outer plate having openings to display the cards therethrough, said inner plate having a hole therethrough behind one of said cards and in front of an operating part of said snap catch.

8. In a device of the class described, an inner member to be attached to the side of a freight car, an outer member to overlie the inner member, cards clamped between the two members, said outer member having openings therethrough to display said cards, a concealed snap catch to hold the outer member closed upon the inner member, and an attachment to be engaged by said catch spaced within the lower edge of the outer member.

9. In a device of the class described, a sheet metal plate having its edges bent back at right angles to its main surface and adapted to be attached to the side of a freight car, an outer plate having its edges similarly bent back over the edges of the inner member, said two members being hinged together at their upper corners, cards clamped between the two members, a locking bolt within the inner member projecting down through the lower edge thereof, and an attachment fastened to the outer member above its lower edge and engaged by said bolt.

10. In a device of the class described, a sheet metal plate having its edges bent back at right angles to its main surface and adapted to be attached to the side of a freight car, an outer plate having its edges similarly bent back over the edges of the inner member, said two members being hinged together at their upper corners, cards clamped between the two members, a locking bolt within the inner member projecting down through the lower edge thereof, and an attachment fastened to the outer member above its lower edge and engaged by said bolt, said inner member having a slot normally concealed by one of said cards and said bolt being adapted to be engaged through said slot.

11. In a device of the class described, a sheet metal plate having its edges bent back at right angles to its main surface and adapted to be attached to the side of a freight car, an outer plate having its edges similarly bent back over the edges of the inner member, said two members being hinged together at their upper corners, cards clamped between the two members, a locking bolt within the inner member projecting down through the lower edge thereof, and an attachment fastened to the outer member above its lower edge and engaged by said bolt, said inner member having a slot normally concealed by one of said cards and said bolt having a sliding block thereon, and a stop on the bolt to limit said block, said block being adapted to be engaged through said slot.

12. In a device of the class described, a member adapted to be secured to a fixed support, a relatively movable member, a card held in fixed position by said members, one of said members having an opening therethrough to display the card, locking means located behind said card for securing said movable member in operative position with respect to said first-named member, and means for inclosing said locking means whereby it is accessible only through said opening after breaking the card.

13. In a device of the class described, a member adapted to be secured to a fixed support, a relatively movable member, a card held in fixed position by said members, one of said memoers having an opening therethrough to display the card, locking means located behind said card for securing said movable member in operative position with respect to said first-named member, means for inclosing said locking means whereby it is accessible only through said opening after breaking the card, and a movable part located behind said card for actuating the locking means, said movable part being arranged to release said locking means after a predetermined extent of breaking of said card.

In testimony whereof, I have subscribed my name.

FREDERICK C. MAEGLY.

Witnesses:
 HENRY A. PARKS,
 E. M. ANDERSON.

Copies of this patent may be obtained for five cents each, by addressing the "Commissioner of Patents Washington, D. C."